United States Patent
Travis

(10) Patent No.: US 10,436,988 B2
(45) Date of Patent: Oct. 8, 2019

(54) FIBER OPTIC CONNECTOR ADAPTER WITH SHUTTER HAVING SELECTIVE WAVELENGTH TRANSPARENCY

(71) Applicant: COMMSCOPE, INC. OF NORTH CAROLINA, Hickory, NC (US)

(72) Inventor: Peter T. Travis, Denton, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 16/083,343

(22) PCT Filed: Mar. 9, 2017

(86) PCT No.: PCT/US2017/021602
§ 371 (c)(1),
(2) Date: Sep. 7, 2018

(87) PCT Pub. No.: WO2017/156289
PCT Pub. Date: Sep. 14, 2017

(65) Prior Publication Data
US 2019/0101703 A1     Apr. 4, 2019

Related U.S. Application Data

(60) Provisional application No. 62/307,090, filed on Mar. 11, 2016.

(51) Int. Cl.
G02B 6/38      (2006.01)
G02B 6/293     (2006.01)
G02B 6/42      (2006.01)

(52) U.S. Cl.
CPC ......... *G02B 6/3825* (2013.01); *G02B 6/3849* (2013.01); *G02B 6/29389* (2013.01); *G02B 6/3845* (2013.01); *G02B 2006/4297* (2013.01)

(58) Field of Classification Search
None
See application file for complete search history.

(56) References Cited

U.S. PATENT DOCUMENTS 5,222,164 A    6/1993  Bass, Sr. et al.
5,317,663 A    5/1994  Beard et al.
(Continued)

FOREIGN PATENT DOCUMENTS

JP     2002-243978 A      8/2002

OTHER PUBLICATIONS

International Search Report and Written Opinion of the International Searching Authority for International Patent Application No. PCT/US2017/021602 dated May 18, 2017, 12 pages.

*Primary Examiner* — Michael Stahl
(74) *Attorney, Agent, or Firm* — Merchant & Gould P.C.

(57) ABSTRACT

An optical fiber adapter for supporting a non-collimated laser light source transmitting a laser light with a first signal wavelength. The optical fiber adapter includes an infrared signal transmitter for transmitting an infrared signal, and an infrared signal receiver for receiving the infrared signal. The infrared signal includes a second signal wavelength. The optical fiber adapter also includes a movable shutter door intersecting the infrared signal in a shutter closed position. The shutter door includes a material that is adapted to pass the infrared signal therethrough when in the shutter closed position. The shutter door includes a material that is adapted to block the first signal wavelength therethrough when in the shutter closed position. The shutter door is positioned distally from the non-collimated laser light source a distance by which the laser light attenuates to not transmit through the shutter door in the shutter closed position. The shutter is (Continued)

movable to a shutter open position to not block the laser light source transmitting the laser light with the first signal wavelength.

18 Claims, 3 Drawing Sheets

(56) References Cited

U.S. PATENT DOCUMENTS

| | | | |
|---|---|---|---|
| 6,511,231 B2* | 1/2003 | Lampert | G02B 6/3825 385/70 |
| 6,811,325 B2* | 11/2004 | O'Connor | G02B 6/3883 385/70 |
| 9,476,795 B1* | 10/2016 | Cogger | G01M 11/088 |
| 2002/0081076 A1 | 6/2002 | Lampert et al. | |
| 2004/0052473 A1* | 3/2004 | Seo | G02B 6/3849 385/73 |
| 2007/0019913 A1 | 1/2007 | Iwai et al. | |
| 2007/0217749 A1 | 9/2007 | Jong et al. | |
| 2010/0054665 A1* | 3/2010 | Jones | G02B 6/3825 385/59 |
| 2012/0128307 A1* | 5/2012 | Takiguchi | G02B 6/3895 385/88 |
| 2017/0003459 A1* | 1/2017 | Takeuchi | G02B 6/3895 |

\* cited by examiner

FIBER OPTIC CONNECTOR ADAPTER WITH SHUTTER HAVING SELECTIVE WAVELENGTH TRANSPARENCY

CROSS-REFERENCE TO RELATED APPLICATION

This application is a National Stage Application of PCT/US2017/021602, filed on Mar. 9, 2017, which claims the benefit of U.S. Patent Application Ser. No. 62/307,090, filed on Mar. 11, 2016, the disclosures of which are incorporated herein by reference in their entireties. To the extent appropriate, a claim of priority is made to each of the above disclosed applications.

TECHNICAL FIELD

The present disclosure relates to an optical fiber connector and adapter system.

BACKGROUND

It is desirable to confirm when a fiber optic connector is inserted into a connector port in an adapter. More specifically, due to remote monitoring and management of fiber optic systems, it is desirable to implement a local solution to monitor which adapter ports are connected to fiber optic connectors and which are not. It is also desirable to implement a shutter door to block laser light transmitted from an optical fiber through an adapter. These laser lights can be harmful to a user's eyes, so the shutter doors prevent any unwanted exposure. The existing technology is lacking with respect to both confirming the presence of a fiber optic connector within an adapter, or lack thereof, as well as blocking the harmful laser light from the optical fiber. As a result, there is a need for improved technology to achieve these functions.

SUMMARY

In an example embodiment, the present disclosure relates to an optical fiber adapter for supporting a non-collimated laser light source transmitting a laser light with a first signal wavelength. The optical fiber adapter includes an infrared signal transmitter for transmitting an infrared signal, and an infrared signal receiver for receiving the infrared signal. The infrared signal includes a second signal wavelength. The optical fiber adapter also includes a movable shutter door intersecting the infrared signal in a shutter closed position. The shutter door includes a material that is adapted to pass the infrared signal therethrough when in the shutter closed position. The shutter door includes a material that is adapted to block the first signal wavelength therethrough when in the shutter closed position. The shutter door is positioned distally from the non-collimated laser light source a distance by which the laser light attenuates to not transmit through the shutter door in the shutter closed position. The shutter is movable to a shutter open position to not block the laser light source transmitting the laser light with the first signal wavelength.

In an additional example embodiment, the present disclosure relates to an optical fiber adapter for supporting a laser light source transmitting a laser light with a first signal wavelength. The optical fiber adapter includes a body construction with a connector port along a connector axis. The optical fiber adapter also includes a first signal transmitter for transmitting a presence sensing light signal, and a first signal receiver for receiving the presence sensing light signal. The presence sensing light signal includes a second signal wavelength, a light path between the first signal transmitter and the first signal receiver being generally transverse to the connector axis within the connector port. The optical fiber adapter also includes a movable shutter door that intersects the presence sensing light signal in a shutter closed position. The shutter door includes a material adapted to pass the presence sensing light signal at least partially therethrough when in the shutter closed position. The shutter door includes a material adapted to block at least a portion of the first signal wavelength therethrough when in the shutter closed position. The shutter door is positioned and constructed such that the laser light attenuates to not transmit potentially eye damaging laser light through the shutter door in the shutter closed position. The shutter is movable to a shutter open position to not block the laser light source transmitting the laser light with the first signal wavelength. The shutter door preferably includes a material adapted to at least partially pass light visible to the human eye therethrough when in the shutter closed position.

In another example embodiment the present disclosure relates to a shutter door made of a material that is adapted to at least partially pass light visible to the human eye therethrough when in the shutter closed position.

In another example embodiment the present disclosure relates to a system for ensuring the correct alignment between a first body and a second body. The system includes an adapter for removably aligning the first body and the second body. The system also includes a sensory wavelength transmitted within the adapter to sense the presence of the first body. The sensory wavelength is interrupted by the first body when the first body is aligned with the second body. Optionally, the sensory wavelength is a laser transmitted between a projector and a receiver. Optionally, the laser has a wavelength that cannot pass through the first body. Optionally, the adapter includes a first receiver for removably receiving the first body, and a second receiver for receiving the second body. Optionally, the sensory wavelength is transmitted within the first receiver. Optionally, the adapter includes a deflectably supported barrier with a material that allows the sensory wavelength to be transmitted therethrough. Optionally, the barrier includes a material that glows when receiving a wavelength of visible light. Optionally, the barrier is deflected through contact with the first body.

DESCRIPTION

Figure 1:
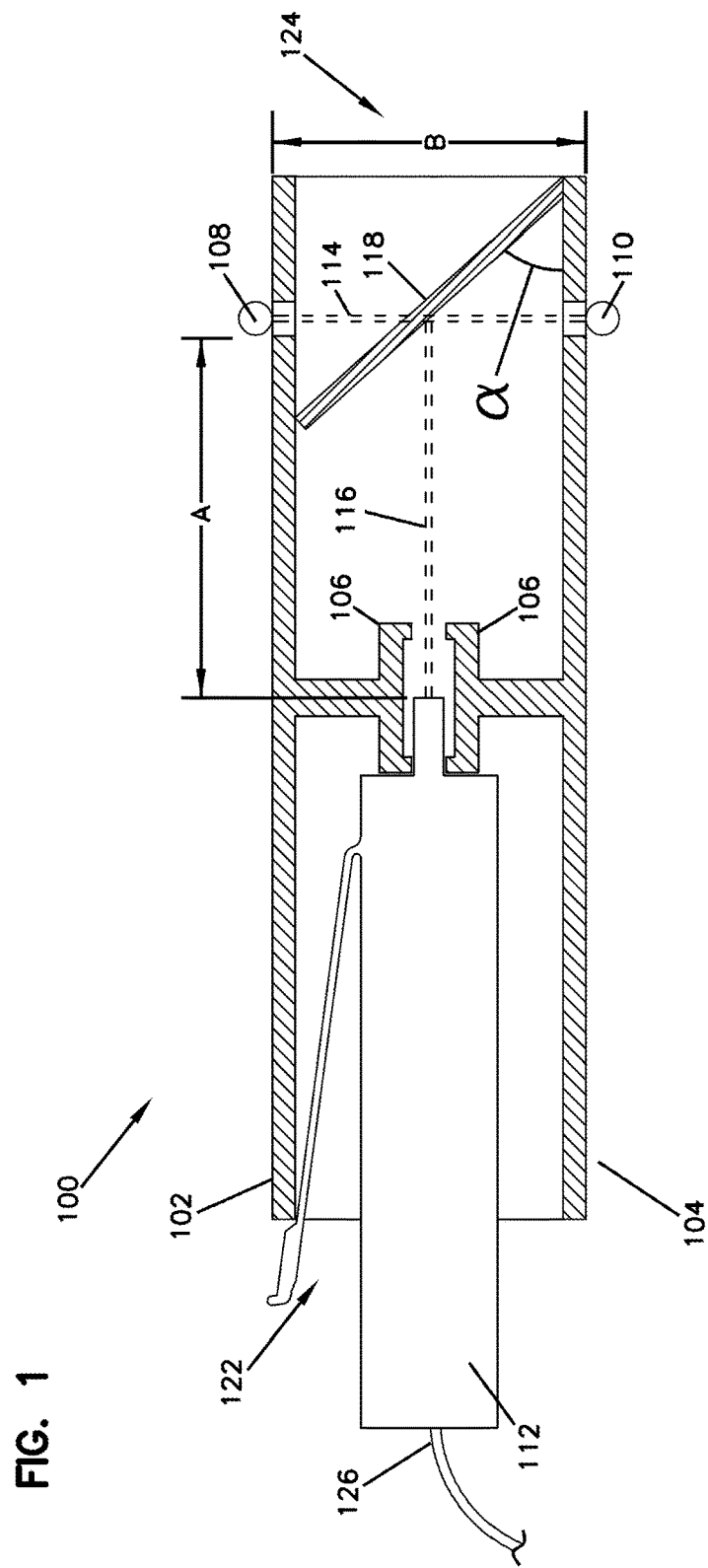
FIG. 1 shows a cross-sectional side view of a fiber optic adapter and a first fiber optic connector with a shutter in a closed position, according to an example embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
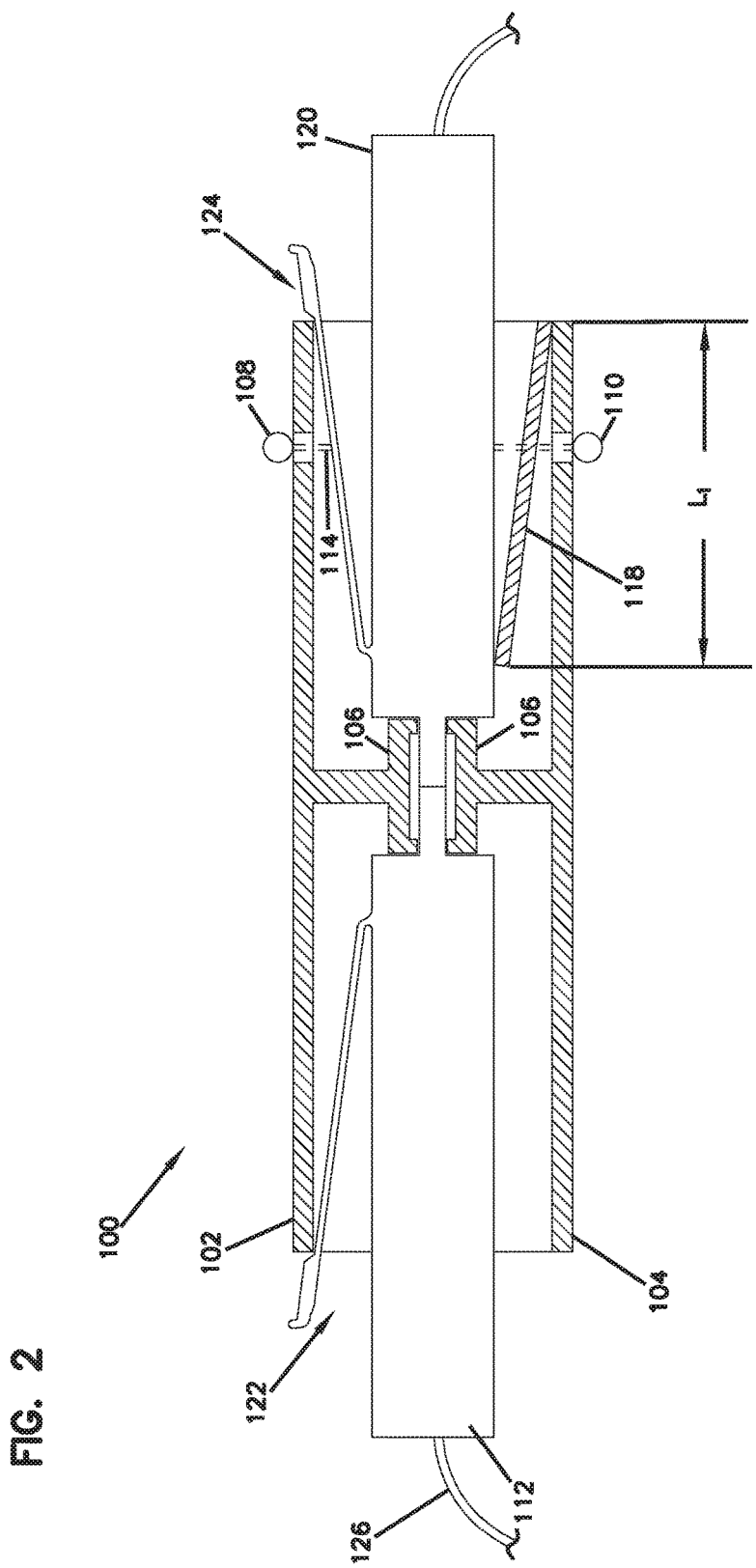
FIG. 2 shows a cross-sectional side view of the fiber optic adapter and first fiber optic connector shown in FIG. 1, showing the shutter in an open position and showing a second fiber optic connector being inserted within the fiber optic adapter for optically communicating with the first fiber optic connector.
Figure 3:
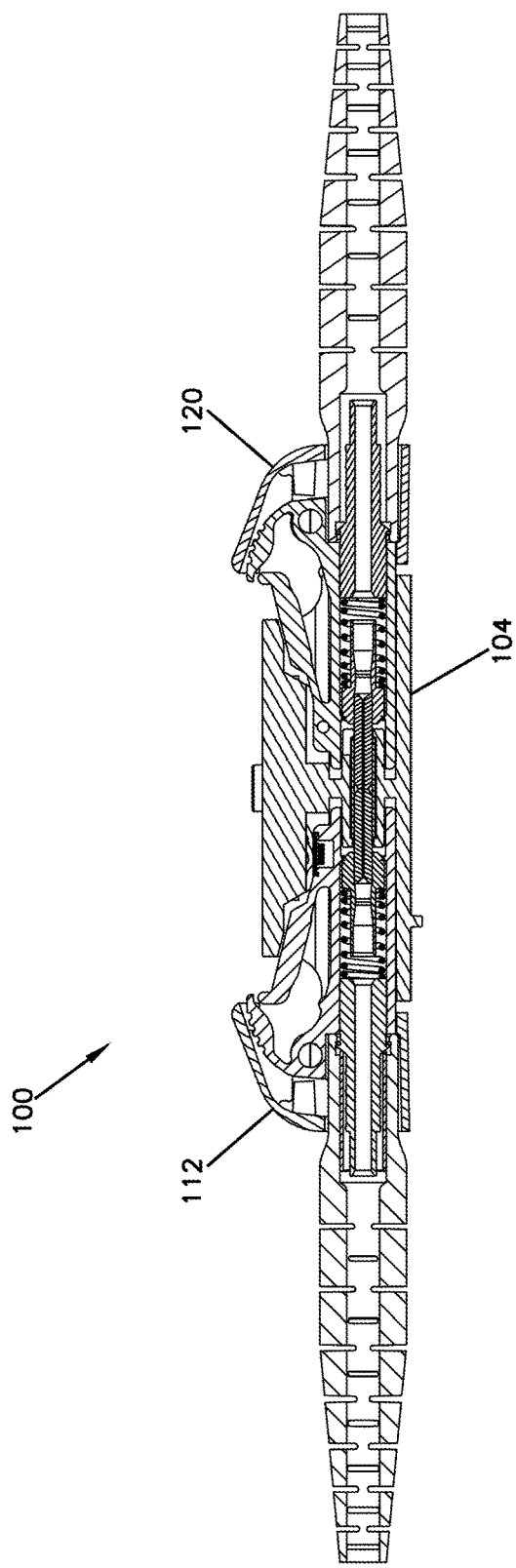
FIG. 3 is a cross-sectional side view of the fiber optic adapter shown in FIG. 2, shown in use with example first and second LC-type fiber optic connectors.

FIGS. 1-3 illustrate an example optical fiber adapter 100 for receiving a pair of fiber optic connectors communicating with each other. The illustrated adapter 100 can be an SC-type adapter, an LC-type adapter, an MPO-type adapter, and ST-type adapter, and MT-RJ-type adapter, and MU-type adapter or any alternative type of fiber optic adapter to receive a pair of communicating fiber optic connectors. An example adapter that can function with this described system is described in U.S. Pat. No. 5,317,663, filed on May 20, 1993, and the disclosure of which is hereby incorporated by reference.

The illustrated fiber optic system includes an adapter 100 with an internal passageway defined between an upper wall 102 and a lower wall 104. The internal passageway is also defined by left and right side walls (not shown) which extend between the upper wall 102 and the lower wall 104. The illustrated internal passageway extends along a connector axis between a central port 122 and a connection port 124 of the adapter 100. The illustrated adapter 100 also includes a fiber receiver 106 supported within the internal passageway between the upper wall 102 and the lower wall 104. In use, the illustrated adapter 100 can be supported in a permanent or semi-permanent condition, for example in a grouping of several similar adapters. The illustrated adapter 100 can be made of injection molded plastic, however, SC and ST type adapters can alternatively be made of die cast metal.

The illustrated fiber receiver 106 receives fibers extending from a distal connection port of a fiber optic connector 112 that is inserted within the internal passageway of the adapter 100. The illustrated fiber connector 112 includes a spring arm or latch, which contacts the upper wall 102 to hold the fiber connector in place within the central port 122 of the adapter 100. Such a construction can be typical, for example, of an LC type fiber optic connector and adapter.

The fiber optic connector 112 is inserted into the central port 122 of the adapter 100. This fiber optic connector 112 can be a connector which receives a signal from a remote source, and can be of the type rarely removed from the adapter 100. In active use when receiving a signal from a remote source, the fiber optic connector communicates a laser light 116 from the fibers at the distal end in the direction towards the connection port 124 of the adapter 100. The illustrated laser light 116 can be non-collimated, therefore, the signal power decreases significantly with distance travelled, as the laser light spreads out in a cone shape. The laser light 116 can have a range of wavelengths, for example between about 850 nm and about 1675 nm.

The illustrated adapter 100 also includes a signal transmitter 108 and a signal receiver 110, positioned oppositely from each other along an axis transverse to the connector axis. As illustrated, the signal transmitter 108 can be positioned at the upper wall 102 of the adapter 100 and the signal receiver 110 can be positioned at the lower wall 104 of the adapter. The illustrated signal transmitter 108 and signal receiver 110 can be positioned a distance B apart from each other. Preferably, the distance B can be between about 10 mm and 15 mm, and more preferably about 13 mm. Preferably, the signal transmitter 108 communicates an infrared signal 114 towards the signal receiver 110. The signal transmitter 108 can be any transmitter capable of communicating the infrared signal 114, and the signal receiver 110 can be any receiver capable of receiving (reading) the infrared signal. The infrared signal 114 can have a range of wavelengths, for example between about 830 nm and about 930 nm in one example. The infrared signal is used for presence sensing of a connector in connection port 124.

Alternatively, a signal transmitter can be oppositely positioned at the lower wall and the signal receiver can be positioned at the upper wall and function effectively. Alternatively still, a signal transmitter can be positioned at the left or right wall, and the signal receiver can be positioned oppositely at the left or right wall accordingly.

The illustrated adapter 100 also includes a shutter (door) 118 that is pivotally supported along the lower wall 104 at the connection port 124. For example, the illustrated shutter 118 can be pivotally supported at the connection port 124 with a resilient spring-loaded hinge forcing the shutter away from the lower wall 104 and toward the upper wall 102. Alternatively, a similar shutter can be pivotally supported along the upper wall 102 or either side wall (not shown) and function with similar mechanics as are described below.

The illustrated shutter 118 can have a height $L_1$ (see FIG. 2) and a width which sufficiently prevent the laser light 116 from exiting the adapter. For example, the shutter 118 can have a width that extends between the inner surfaces of the left and right side walls (not shown) of the adapter 100. The shutter 118 has dimensions that preferably obscure the opening of the connection port 124. For example the shutter 118 can have a height $L_1$ of about 11 mm and a width of about 11 mm.

The specific materials, additives, thickness and angle $\alpha$ (with respect to the lower wall 104) of the shutter 118 can depend on the specific type and wavelength of light with which the shutter is to function. For example, the light can be a laser light (the signal carrying light), an infrared light (the presence sensing light) and/or a visible light (the signal tracing light). Further, the light can have a variety of fixed or variable wavelengths directed toward, or in the path of, the shutter 118.

The illustrated shutter 118 can have a thickness (i.e., between distal and proximal surfaces) of about 1.5 mm. In an at-rest condition illustrated in FIG. 1, the shutter 118 is positioned at an angle $\alpha$ with respect to the lower wall 104. For example, the at-rest angle $\alpha$ can be about 50°. The height $L_1$ of the shutter 118 preferably causes the distal free end of the shutter to engage the inner surface of the top wall 102 in an at-rest condition, as is illustrated. In the at-rest condition, the distal free end of the shutter 118 contacts the upper wall 102 at a point between the signal transmitter 108 and the fiber receiver 106.

In the illustrated at-rest condition, the shutter 118 intersects the infrared signal 114. Depending on the exact angle of the at-rest shutter 118 with respect to the lower wall 104, the infrared signal 114 passes through the shutter a greater distance (e.g., 2.5 mm when angle is 50°) than the above described thickness of the shutter (1.5 mm). Preferably the at-rest shutter 118 at an angle $\alpha$ such that it avoids contact with the ferrule end face upon connector insertion. The angle $\alpha$ is dependent on mounting location of the hinge & the size of the connection port 124 opening. Discreet adapters or a different construction of a ganged adapter could result in a different angle $\alpha$ because of the particular feature of a given design. For example, the angle $\alpha$ could be between 1°-90° depending on length of the shutter 118 and it's hinge position relative to the internal passageway, lower wall 104 and upper wall 102. As additionally shown, in the at-rest condition, the laser light 116 is directed towards the shutter 118.

As described above, the laser light 116 is not collimated, therefore the laser light spreads out in a cone shape and decreases in power (intensity) as it gets further away from the optical fiber on the connector 112. The illustrated distance A, preferably 9 mm, between the fibers extending from the distal connection port of the fiber connector 112 and the contact point on the at-rest shutter 118 is sufficient to achieve an attenuation of the laser light 116 thus preventing the laser light from transmitting through the shutter with any eye damaging intensity.

The illustrated shutter 118 can be composed of an amorphous polycarbonate-based resin which allows uninterrupted transmission of the infrared signal 114 therethrough for presence sensing of the connector. The resin can form the shape of the shutter 118, for example, through injection molding. The resin preferably includes light diffusing additives, for example silicone powder, to further attenuate the power of the laser light 116 by scattering the light, as opposed to maintaining a concentrated spot.

The illustrated shutter 118 can additionally allow a user to conduct tracing for determining the accuracy of two communicating connector ends of an optical fiber. For example, often a user wishes to ensure that a fiber connector that is to be inserted into the connection port 124 of the adapter 100 will communicate with the correct opposing fiber connector 112 inserted into the central port 122. This fiber connector 112 in the central port 122 is also receiving a signal from the fiber cable 126, which carries the signal from a remote fiber connector or other structure at the other end of the fiber cable. A user may connect a visible light source, for example a flash light emitting a red light visible to the human eye, to this remote fiber connector at the other end of the fiber cable 126, which correspondingly transmits a visible light wavelength from the fiber connector 112 in the central port 122 of the adapter 100. This visible light is transmitted along a similar path as the laser light 116 described above, toward the shutter 118 and the connection port 124 of the adapter 100. Upon reaching the at-rest shutter 118, as illustrated in FIG. 1, the visible light can be seen through the opposing side of the shutter, thus allowing the correct adapter 100 to be identified by a user. For example, the visible light can be transmitted through the shutter 118 in a scattered pattern visible through the shutter. The tracing light can cause the shutter 118 to glow red for example. Wavelengths of 630 nm to 670 nm can be used for fiber tracing.

Example materials which can be used to form the shutter 118 in order to transmit infrared signals therethrough, based on commonly understood wavelengths, can include black plexi-glass, calcium fluoride and fused silica. The shutter 118 can alternatively be a glass substrate with materials added through doping, for example germanium, sapphire, silicon and zinc selenide. More preferably, germanium and silicon both allow uninterrupted transmission of infrared signals, and also diffuse laser light signals, while also scatter transmitting visible light, based on commonly understood wavelengths. Alternatively, if the shutter door 118 is made of a simple resin material which has sufficient transmissivity to allow desired wavelengths to pass through without significant strength, a thin film coating of material (e.g., titanium oxide) can be applied to the signal-receiving side of the shutter door 118 to act as a band pass filter to achieve the same functionality. In essence, the thin film coating functions to block the non-desired wavelengths.

As illustrated in FIG. 2, a second fiber connector 120 can be inserted into the internal passageway of the adapter 100 through the connection port 124. This second fiber connector 120 can be structurally and functionally similar to the fiber connector 112 inserted into the central port 122. In use, this second fiber connector 120 is inserted into the adapter 100 to optically communicate with the first fiber connector 112. For example, the laser light 116 transmitted from the first fiber connector 112 is optically received by the second fiber connector 120. For example, the ferrule of each connector will contact the other respective ferrule to transmit the laser signal from one fiber to the next.

As illustrated, when the second fiber connector 120 is inserted into the connection port 124 of the adapter 100, the body of this second fiber connector applies a force onto the shutter 118, thus forcing the shutter to pivot downward toward the lower wall 104 of the adapter. As illustrated, when the second fiber connector 120 is inserted within the connection port 124 of the adapter 100, the angle $\alpha$ of the shutter 118 with respect to the lower wall 104 is about 0°, thus the shutter is parallel or close to parallel to the lower wall. Correspondingly, when the second fiber connector 120 is removed from the connection port 124 of the adapter 100, the shutter 188 automatically resiliently returns to the at-rest position described in FIG. 1.

The second fiber connector 120 can be composed of material which does not transmit infrared wavelengths therethrough. As a result, when the second fiber connector 120 is inserted into the connection port 124 of the adapter 100, the body of the second fiber adapter intersects the infrared signal 114 transmitted from the signal transmitter 108 and prevents the infrared signal 114 from being received by the signal receiver 110. When the signal receiver 110 does not receive the infrared signal 114, the signal receiver notifies a remote device, for example a computer, that a fiber connector has been inserted into the connection port 124 of the adapter 100. Correspondingly, when there is not a fiber connector within the connection port 124 of the adapter, and the signal receiver 110 receives the infrared signal 114, the signal receiver either sends no such notification to a remote device or sends a notification to a remote device that there is no fiber connector within the connection port of the adapter.

The adapter 100 illustrated in FIG. 3 functions similarly to the adapter described above. The first 112 and second 120 LC-type fiber optic connectors illustrated also function similarly to those described above. The adapter 100 is shown without a shutter, similar to the shutter 118 above, however, such a shutter is intended to be inserted and function equivalently to the embodiment described above. The lower wall 104 illustrated is similar in function and geometry to the lower wall described above.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. An optical fiber adapter for supporting a non-collimated laser light source transmitting a laser light with a first signal wavelength, the optical fiber adapter comprising:
an infrared signal transmitter for transmitting an infrared signal, and an infrared signal receiver for receiving the infrared signal, the infrared signal comprising a second signal wavelength; and
a movable shutter door intersecting the infrared signal in a shutter closed position, the shutter door comprising a material adapted to pass the infrared signal therethrough when in the shutter closed position, the shutter door comprising a material adapted to block the first signal wavelength therethrough when in the shutter closed position, the shutter door being positioned distally from the non-collimated laser light source a distance by which the laser light attenuates to not transmit through the shutter door in the shutter closed position, the shutter movable to a shutter open position to not block the laser light source transmitting the laser light with the first signal wavelength.

2. The optical fiber adapter of claim 1, wherein the shutter door material comprises amorphous resin.

3. The optical fiber adapter of claim 1, wherein the shutter door material is adapted to diffuse the laser light with the first signal wavelength.

4. The optical fiber adapter of claim 3, wherein the shutter door material comprises light diffusing additives.

5. The optical fiber adapter of claim 4, wherein the light diffusing additives comprise silicone.

6. The optical fiber adapter of claim 1, wherein the shutter door material comprises at least one from a group comprising calcium fluoride, fused silica, germanium, sapphire, silicon and zinc selenide.

7. The optical fiber adapter of claim 1, wherein the shutter door material comprises at least one from a group comprising germanium and silicon.

8. The optical fiber adapter of claim 1, wherein the shutter door material comprises a coating of titanium oxide.

9. The optical fiber adapter of claim 1, wherein the shutter door is resistantly pivotal with respect to the non-collimated laser light.

10. The optical fiber adapter of claim 9, wherein the shutter door comprises a range of pivotal movement between 0° and 50° with respect to a baseline.

11. The optical fiber adapter of claim 1, wherein the shutter door comprises a material adapted to at least partially pass light visible to the human eye therethrough when in the shutter closed position.

12. A system for ensuring the correct alignment between a first body and a second body, the system comprising:
an adapter for removably aligning the first body and the second body; and
a sensory wavelength transmitted within the adapter to sense the presence of the first body, the sensory wavelength being interrupted by the first body when the first body is aligned with the second body;
wherein the adapter comprises a deflectably supported barrier comprising a material that allows the sensory wavelength to be transmitted therethrough.

13. The system of claim 12, wherein the sensory wavelength is a laser transmitted between a projector and a receiver.

14. The system of claim 12, wherein the adapter comprises a first receiver for removably receiving the first body, and a second receiver for receiving the second body.

15. The system of claim 14, wherein the sensory wavelength is transmitted within the first receiver.

16. The system of claim 12, wherein the barrier comprises a material that glows when receiving a wavelength of visible light.

17. The system of claim 12, wherein the barrier is deflected through contact with the first body.

18. An optical fiber adapter for supporting a laser light source transmitting a laser light with a first signal wavelength, the optical fiber adapter comprising:
a body construction including a connector port along a connector axis;
a first signal transmitter for transmitting a presence sensing light signal, and a first signal receiver for receiving the presence sensing light signal, the presence sensing light signal comprising a second signal wavelength, a light path between the first signal transmitter and the first signal receiver being generally transverse to the connector axis within the connector port; and
a movable shutter door intersecting the presence sensing light signal in a shutter closed position, the shutter door comprising a material adapted to pass the presence sensing light signal at least partially therethrough when in the shutter closed position, the shutter door comprising a material adapted to block at least a portion of the first signal wavelength therethrough when in the shutter closed position, the shutter door being positioned and constructed such that the laser light attenuates to not transmit potentially eye damaging laser light through the shutter door in the shutter closed position, the shutter movable to a shutter open position to not block the laser light source transmitting the laser light with the first signal wavelength, the shutter door comprising a material adapted to at least partially pass light visible to the human eye therethrough when in the shutter closed position.

* * * * *